United States Patent [19]

Vernon et al.

[11] Patent Number: 4,715,002

[45] Date of Patent: Dec. 22, 1987

[54] SYSTEM FOR RECORDING A VARIABLE VALUE, NOTABLY IN A WELL, AND FOR COMPRESSING STORED MEASUREMENT INTERVAL DATA

[75] Inventors: Patrick Vernon, Montrouge; Jean-Claude Ostiz, Héricy, both of France

[73] Assignee: Schlumberger Technology Corporation, Houston, Tex.

[21] Appl. No.: 922,809

[22] Filed: Oct. 27, 1986

Related U.S. Application Data

[63] Continuation of Ser. No. 419,250, Sep. 17, 1982, abandoned.

[30] Foreign Application Priority Data

Nov. 4, 1981 [FR] France ................. 81 20685

[51] Int. Cl.$^4$ .............. G06F 15/20; E21B 47/06; E21B 47/00
[52] U.S. Cl. .................... 364/422; 364/178; 73/151
[58] Field of Search ............... 364/178, 179, 422, 558, 364/571, 573, 769; 340/853, 857, 858, 860; 324/323; 374/136; 73/151, 152, 154

[56] References Cited

U.S. PATENT DOCUMENTS

| | | | |
|---|---|---|---|
| Re. 31,222 | 4/1983 | McCracken | 364/571 |
| 3,139,318 | 6/1984 | Mellon | 339/258 F |
| 3,794,981 | 2/1974 | O'Connor | 364/200 |
| 3,977,245 | 8/1976 | Clark et al. | 73/151 |
| 4,010,462 | 3/1977 | Armistead | 340/347 DA |
| 4,016,557 | 4/1977 | Zitelli et al. | 367/67 X |
| 4,033,186 | 7/1977 | Bresie | 73/154 |
| 4,161,782 | 7/1979 | McCracken | 364/571 |
| 4,308,585 | 12/1981 | Jordan | 364/179 X |
| 4,439,831 | 3/1984 | Sinclair | 364/422 |
| 4,471,310 | 9/1984 | Yenisey | 328/14 |

FOREIGN PATENT DOCUMENTS 0019672 12/1980 European Pat. Off. .
2003682 3/1979 United Kingdom .

OTHER PUBLICATIONS

English Language Translation of FR 2276565.
Khandheria, J. et al., "Adaptive Sampling Increases Sampling Rate as Process Deviations Increase," *Control Engineering*, vol. 24, No. 2, Feb. 1977, 33–35.

*Primary Examiner*—Jerry Smith
*Assistant Examiner*—Clark A. Jablon

[57] ABSTRACT

To acquire and record the variation of a value such as a pressure as a function of a parameter such as time in a sonde (10) lowered into a well (12), pressure measurements are made at equal time intervals, these measurements are digitized and entered in a nonvolatile memory selectively so as to maximize the accuracy of the pressure variation reading during the measurement period, while minimizing the memory volume necessary for this purpose. The selection of the acquired measurements for their recording comprises a data compression stage in which are eliminated the measurements which do not correspond to a variation in the slope of the pressure-versus-time curve greater than a predetermined threshold.

The data compression is effected in a buffer memory in which each measurement has associated with it a deviation index indicative of the time interval separating this measurement from the following one in the buffer memory. This time interval amounts to a number of elementary time intervals which is always a power (n) of 2, n integer, and the exponent n is stored as the deviation index.

15 Claims, 12 Drawing Figures

| | ENTRY | | |
|---|---|---|---|
| 81₉ | Q I | 0 | 83₉ |
| 81₈ | Q H | 0 | 83₈ |
| | Q G | 0 | |
| | Q F | 0 | |
| | Q E | 0 | |
| | Q D | 0 | |
| | Q C | 0 | |
| | Q B | 0 | |
| 81₁ | Q A | 0 | 83₁ |

*Fig. 6b*

| | ENTRY | |
|---|---|---|
| 81₉ | Q K | 0 |
| 81₈ | Q J | 0 |
| | Q I | 0 |
| | Q H | 0 |
| | Q G | 0 |
| | Q F | 0 |
| | Q E | 0 |
| | Q C | 1 |
| 81₁ | Q A | 1 |

*Fig. 6c*

| | ENTRY | |
|---|---|---|
| 81₉ | Q M | 0 |
| 81₈ | Q L | 0 |
| | Q K | 0 |
| | Q J | 0 |
| | Q I | 0 |
| | Q H | 0 |
| | Q G | 0 |
| | Q E | 1 |
| 81₁ | Q A | 2 |

SYSTEM FOR RECORDING A VARIABLE VALUE, NOTABLY IN A WELL, AND FOR COMPRESSING STORED MEASUREMENT INTERVAL DATA

This application is a continuation, of application Ser. No. 419,250, filed Sept. 17, 1982, now abandoned.

The present invention relates to the recording of measurements. It is applicable in particular to measurements carried out in locations of difficult access such as petroleum wells or boreholes, for example, in which it is not possible, either practically or economically, to transmit the measurements made directly to an operating station. It is known that, particularly in the petroleum area, it is current to carry out measurements in a well by lowering a sonde into the well suspended from a simple cable or a wire-line whose only function is to provide the mechanical support for the tool so that it can be moved in the well. The sonde is equipped with measuring instruments sensitive to the physical parameters characteristic of the well and the media traversed by the well. According to the type of measurement considered, a recording of the variation of the measured values is made as a function of sonde depth or as a function of time, for example. In one application case, a pressure measurement sonde is lowered to a previously determined depth in the vicinity of a petroleum producing zone and then the well is closed to measure the build-up of pressure around the sonde as a function of the tendency of the fluids to escape from the formations in which they are confined. The study of the pressure build-up curves obtained by this method is precious for petroleum companies. These curves are compared with models in order to determine certain parameters related to the behavior of the reservoir (permeability, evolution of reservoir with respect to time, capacity to produce under certain conditions, etc.).

A similar measurement can be carried out for the pressure drop (drawdown curve) at a point of the well when the well is suddenly changed over from a closed condition in which the fluids are stabilized to an open condition allowing the resumption of the flow of fluids coming from the producing formations.

Of course, there other values whose variation in a well can be usefully recorded as a function of a parameter such as time or depth, for example the flow of fluids, their temperature, etc.

In the case where the sonde suspension cable cannot be used for the transmission of power and information between the sonde and the surface, or when the sonde is lowered by means of a drill string and not a cable, the sonde must be provided with an independent source of energy to supply the measuring transducers as well as with an apparatus recording the data measured as a function of the sought parameter supplied by this same source.

Owing to the relatively long period of time during which such sondes are required to remain in the well, under severe environmental conditions, it is necessary to equip them with relatively rugged and compact apparatus, nevertheless capable of furnishing results as precise and reliable as possible.

Furthermore, the memory capacity of these apparatus is limited by their volume and does not always make it possible to record measurements with the desired accuracy owing to the sometimes long measurement period.

Even in the case where the tool is connected to the surface by an electric cable, there are situations in which a limitation in the volume of the data to be recorded in a durable manner is desirable.

To overcome these difficulties, it has already been proposed to take into account the variation rate of the recorded values in order to limit the number of measurement samples stored in memory during a recording run based upon the observation that the sampling density of such values can be reduced when the variation rate of the value as a function of the variation parameter is small. Thus, in the U.S. Pat. No. 4,161,782, in the name of McCracken, for example, has been proposed a tool for recording the evolution of pressure and temperature in a well in which the measurements are sampled and transcribed in digital form and in which the variation rate of these values is determined as the digital samples are being acquired in order to obtain a variation, as an inverse function of this rate, in the acquisition rate of these samples. The result is that when the measured value varies slowly, the sampling density is reduced. On the other hand, it is increased to store more information when the variation in the value concerned is fast.

This technique has the drawback of requiring the coding of the values of the parameter for each sample of the measurements, and this is a complex procedure. In addition, the modification of the sampling rate in response to the variations in the measured value takes place with a certain inertia reducing its reliability in the case of sudden slope changes in the curve representative of the phenomenon to be recorded, for example at the beginning of the recording of a pressure build-up curve in a well.

It is the object of the invention to eliminate these drawbacks and to make it possible to obtain reliable recordings of the variation of a value as a function of a parameter, notably in a well, using a minimum recording capacity, and this even when the evolution rate of the measured value undergoes relatively considerable variations for a relatively small variation interval of the reference parameter.

For this purpose, the invention provides notably a technique for recording measurement data, notably in a well, carried out at given intervals of the variation of a parameter, in which samples of said measurements are acquired as they become available at said given intervals; the samples successively acquired are processed to select from among them respective samples which correspond to variations in the rate of change of the measured value as a function of this parameter, at least higher than a threshold fixed according to a predetermined relation; and a recording is made in the well of the data corresponding to the samples thus selected with a view to their subsequent processing.

In one of its aspects, the invention aims to provide a method for recording measurements of a physical value characteristic of the condition of an underground reservoir, obtained by means of a sonde lowered into a well and including at least one transducer sensitive to this value, a computer device including a buffer memory of the first-in first-out type and a nonvolatile memory unit, characterized by the following stages:

a timing device is operated in accordance with the evolution of a parameter in relation to which it is sought to evaluate the variation in the said value, to produce signals at constant intervals of this parameter;

the transducer is supplied to produce electric signals as a function of said value;

a measurement of said value is made by means of the electric output signals of the transducer in correspondence with each of said interval signals to produce a digital sample of each of said measurements;

each of said digital samples is entered in the buffer memory in their order of acquisition;

also entered into this buffer memory, in correspondence with each sample entered, is a deviation index characteristic of the variation interval of the parameter separating this sample from an adjacent sample in the order of entry into this buffer memory;

(a) after each entry of a sample, the buffer memory is scanned in search of two equal consecutive deviation indices, these two deviations corresponding to a first, a second and a third adjacent sample in the order of their entry into said buffer memory;

(b) if this search is unsuccessful, and if the memory is full,
  a recording is made in said nonvolatile memory of a digital information item corresponding to the oldest sample acquired in the buffer memory;
  the next measurement is carried out in response to the corresponding interval signal to produce a respective digital sample, and
  this sample is entered in said buffer memory;

(c) if this search shows such a set of a first, a second and a third sample,
  a check is made, by means of the computer, to determine whether these samples satisfy a predetermined relation denoting that the rate of change of said value between the first and the third sample has undergone a variation smaller than the predetermined threshold;

(d) if this relation is satisfied,
  the second sample is eliminated from said buffer memory;
  the deviation index is incremented between the first and the third sample by the corresponding value in said buffer memory;
  the next measurement is carried out in response to the corresponding interval signal to produce the respective digital sample, and
  this sample is entered in the buffer memory;

(e) if this relation is not satisfied and if the buffer memory is full,
  information corresponding to the oldest sample in the buffer memory is made to enter the nonvolatile memory;
  the next measurement is carried out in response to the corresponding interval signal to produce the respective digital sample, and
  this sample is entered in the buffer memory; and (f) operation a) and the following are repeated after each entry of a new sample in said buffer memory.

According to a preferred embodiment, particularly simple to implement, the sample acquisition intervals are multiples of a power of two of an elementary interval, and each interval between a first and a second sample of this series is characterized by assigning to one of these samples a deviation index representative of the base-2 logarithm of the multiplier.

Furthermore, according to a simple embodiment of the invention, one determines whether or not the variations in the evolution rate of the measured value exceed a threshold justifying the conservation or the elimination, respectively, of an intermediate sample in said series by comparing the difference between the half-sum of the first and third samples and the second sample with a threshold value.

According to one embodiment, the data recorded in the nonvolatile memory are either deviations between the successively recorded samples or values of these samples according to the value of these deviations.

Concretely, for example in the case of the pressure build-up in a well following the closing of the flow valves, the selection process adopted enables the recording of a very large number of measurement data during the initial pressure build-up phase. In fact, though of short duration, it undergoes a very rapid evolution not only in the pressure build-up rate, corresponding to a steep slope on the sought curve, but also in the rate of change in this slope, which justifies a maximum memory input rate for the measurement samples.

On the other hand, when the pressure build-up rate in the well slows down and tends to take on an asymptotic shape, the changes in the slope of the sought curve are much slower than can be determined with sufficient accuracy simply by storing in memory a fraction of the measured samples. Thus, for a given memory capacity it is possible to have a corresponding longer recording time for a given accuracy.

According to another of its aspects, the invention also aims to provide an apparatus employing the techniques mentioned above and which can include, at the output of one or more transducers, means capable of producing measurement samples, preferably digital, and a buffer memory of the first-in first-out type comprising a predetermined number of memory positions in which the measurement samples are entered successively as they are acquired. Selected samples can be directed at the output of this buffer memory, in the order of their acquisition, in the direction of a nonvolatile digital data memory. A process for selection from among the samples admitted into this buffer memory is performed under the control of a processing device such as a microprocessor which includes the scanning, in the order of their arrival in the memory, of the stored samples to eliminate those which do not correspond to a variation in the evolution rate of the measured value greater than a predetermined threshold as explained above.

The nonlimitative explanations and descriptions of embodiment examples which follow are given with reference to the appended drawings in which.

Figure 1:
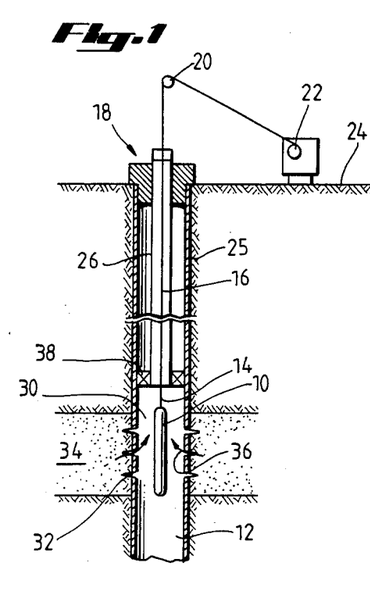
FIG. 1 is a schematic representation of a sonde in operation in a petroleum well.

A measuring sonde 10 in a producing petroleum well 12 is suspended at the end of line 14 or of a cable 16 which goes through a wellhead 18 on the surface, runs over a return pulley 20 and winds on a winch 22 making it possible to move the sonde 10 by reeling or unreeling the cable. The well 12 is consolidated by a casing 25. A production string 26 in which the cable 16 runs is mounted between the wellhead 18 and a zone 30 at the base of the well in the vicinity of the perforations 32 in the casing allowing the outlet into the well of fluids under pressure contained in a formation 34 as indicated by the arrows 36. The zone 30 is limited over the perforations 32 by a packer 38 closing off the annulus between the base of the production string 26 and the casing 25.

When a well such as 12 is put into production or, subsequently, when it is desired to test the evolution of its production conditions, a frequent procedure is to study the pressure build-up curve inside the well when the upper end of the production string 26 at the wellhead 18 is closed to stop the flow of fluid produced by the formation 34. The sonde 10 is equipped with a pressure measurement gauge and an independent measurement recording device which furnishes, when the sonde 10 is raised to the surface, a pressure build-up curve of the type shown in FIG. 2. The curve 40 represents the evolution of pressure P measured by the sonde 10 as a function of time t from the point defined by the time $t_0$ and the pressure $P_0$ prevailing in the well the moment the wellhead is closed. The curve 40 presents a part $40_1$ representing a very sharp rise in pressure lasting a brief interval of time, from a few tens of seconds to a few minutes. It then levels off and tends asymptotically in a part $40_2$ toward an equilibrium pressure $P_f$. Broken lines have been used to represent a curve 42 obtained under similar conditions but for a different formation, or for the same formation after it has been exploited for a certain time.

Figure 2:
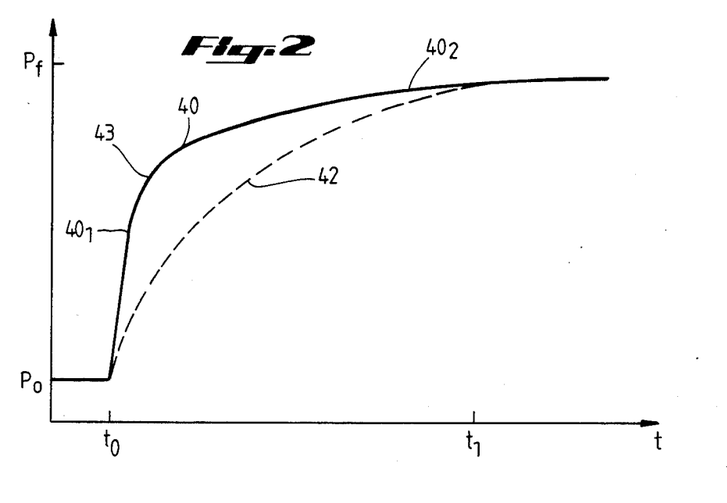
FIG. 2 illustrates a pressure build-up curve at a point of the well when the head of the production string is closed.
Figure 3:
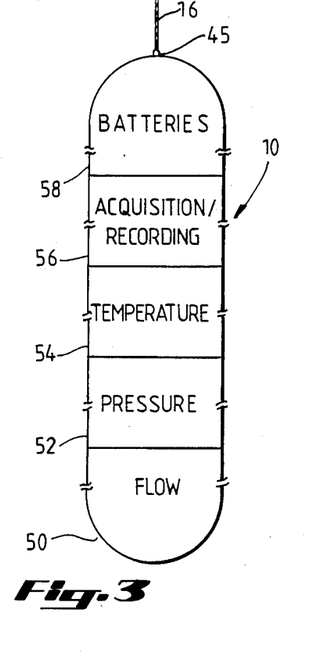
FIG. 3 represents schematically the composition of a sonde in which the invention is implemented.

FIG. 3 represents a more detailed view of the sonde 10 suspended via its summit 45 from the cable 16. In the frequent case for measurements in producing wells where the cable 16 is a simple wire-line without an electrical conductor, the sonde 10 must possess an independent electric power supply for the transducers and the equipment for processing and recording the consecutive measurements. These measurements can be carried out while leaving the sonde at a given depth during the period of a measurement, as in the case of the determination of the pressure build-up curves as represented in FIG. 2 or in the case of the opposite measurement of pressure drawdown. The measurements can also be conducted as a function of depth if a relation is established between the time measurement carried out inside the sonde 10 and the movement of the cable or wire-line 16 in one direction or the other.

The sonde of FIG. 10 comprises, at its bottom, a flowmetering device 50, for example of the screw type, like the one described in French Pat. No. 2276565. Over the module 50 is mounted a pressure measurement module 52 comprising for example a piezoelectric crystal gauge or a diaphragm-type strain gauge driving an oscillator with a controlled frequency (VCO). In both cases, the pressure variations result in variations in the output frequency of the pressure module.

Over this transducer is mounted a temperature measurement module 54 which can be typically made up of a platinum resistor or a semiconductor junction also connected to a VCO. The assembly of these modules 50 to 54 is connected to an electronic cartridge 56 mounted over the temperature transducer 54 and receiving the results of transducer measurements and, after suitable processing, proceeding with their recording. This cartridge comprises a clock delivering pulses allowing notably the measurement of time. It is itself supplied from one or more battery modules 58 mounted over this cartridge and attached directly to the cable or wire-line 16. The cartridge 56 is also arranged for the association, with the measured frequency values, of suitable calibration coefficients recorded in the factory in the modules 50, 52 or 54. The correction of the pressure values obtained as a function of the temperature variations detected by the temperature sonde is carried out subsequently during computer processing at the end of the operation.

In the represented example, the cartridge is moreover programmed to carry out selective sampling of the temperature, pressure and possibly flow measurements and their digitizing before processing and recording. This digitizing is achieved by means of a circuit of the frequency-meter type or the period-meter type from signals produced at the output of the transducers 50, 52 and 54, for example by means of a shaping stage followed by a pulse counter controlled by a sychronization device during equal successive time intervals for each of the different measurements, the number of oscillations counted at the end of a standard or reference time interval, which defines the sampling period, furnishing a direct binary digital indication of the sampled value.

The following explanations will cover more particularly the processing of the pressure samples acquired with a view to storing in a relatively limited nonvolatile memory volume a number of samples representative of the evolution to be determined during a given measurement interval such as $t_0$, $t_1$ (FIG. 2) which may be a few hours; these samples are to be conserved until the sonde 10 is brought up to the surface. After dismantling the tool, the cartridge 56 is connected to a terminal for the reading, retranscription and possible processing of the data.

Owing to the very great disparity between the variation rates of the measured value, for example during a pressure build-up measurement, between the beginning and end of the measurement, it is advantageous, while maintaining a regular pressure sample acquisition rate, to vary the recording frequency of the latter while taking into account the evolution of the recorded phenomenon. Thus, if a pressure measurement sample is obtained every second, i.e. at a sufficiently high frequency to make it possible to follow accurately the initial pressure build-up phase in the well when it is closed, almost all these samples are recorded at the beginning of the pressure build-up or during phases in which the variations in the pressure build-up rate are large, for example in the vicinity of the bend 43 connecting the parts $40_1$ and $40_2$ of the curve 40. On the other hand, for a suitable selection of these samples, provision is made for allowing the recording in the nonvolatile memory of only a fraction of these samples on the asymptotic portion of the curve $40_2$.

This reduction of the volume of measurement data recorded is obtained by a process which will be described in a general manner with reference to FIG. 4 which represents a curve 60 connecting the representative points 60A, 60B, 60C, etc., up to 60I of a series of successive measurement samples of a value Q at equal successive time intervals measured along the axis of abscissas t. We first consider the points 60A, 60B and 60C and we form the half-sum $(Q_A+Q_C)/2$ which is compared with the value $Q_B$. If the difference in absolute value between this half-sum and the value $Q_B$ is smaller than or equal in absolute value to a threshold chosen in advance equal to k/2, it is decided not to record the sample $Q_B$ which is hence eliminated from any future consideration. A rule 64 of length k parallel to the axis OQ and centered in the middle of the segment 60A–60C is used to represent the tolerance interval within which must be located the ordinate $Q_B$ of an intermediate point such as 60B to be eliminated.

We then consider the samples 60C, 60D and 60E separated successively by equal successive time intervals and we apply the same criterion as previously which leads, as shown by the rule 65, to the elimination of the sample 60D.

The series of samples 60A to 60I is continued after having eliminated the samples 60B and 60D, always starting again from the origin 60A and selecting the first group of three samples separated by equal successive time intervals, i.e. in this case 60A, 60C and 60E. In the example chosen in FIG. 4, the ordinate of the sample 60C falls within the interval defined by the rule 66 centered in the middle of the chord 60A, 60E which, in accordance with the principles indicated earlier, leads to the elimination of the sample 60C.

The process is continued by considering the successive samples 60E, 60F and 60G which are separated by equal successive time intervals and so on. It is noted that the process leads to the elimination of the points 60F, 60H and 60G. When, during the next operation, the remaining samples 60A, 60E and 60I are considered, it is noted that the ordinate of the samples 60E is outside the interval defined by the rule 70 of amplitude k and centered in the middle of the chord 60A and 60I. It is then decided to record the sample $Q_E$ corresponding to the point 60E after the recording of the sample $Q_A$ corresponding to point 60A, the first considered in the series.

It is noted that by using this procedure, all the samples are eliminated which defined arcs of the curve 60 whose slope variation does not exceed a threshold determined in advance and which, consequently, within the accuracy limit of the measurements, can be regarded as on the same straight line. On the other hand, as soon as an arc such as 60A to 60I is encountered along which the slope has varied beyond the fixed threshold, we conserve, for its recording, the intermediate point 60E after the point 60A.

Figure 6A:
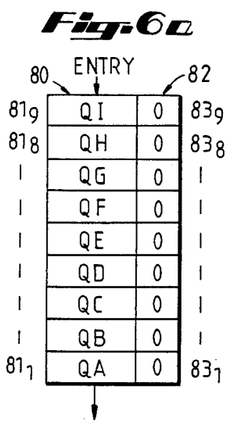
FIGS. 6a, 6b and 6c represent schematically the condition of a buffer memory of an apparatus according to the invention in the different stages of the process described in relation to FIG. 4.
Figure 6B:
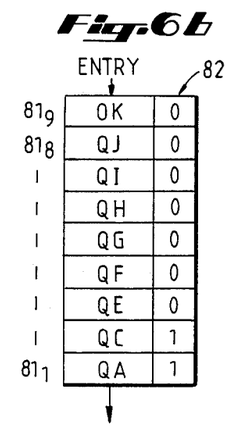
Figure 6C:
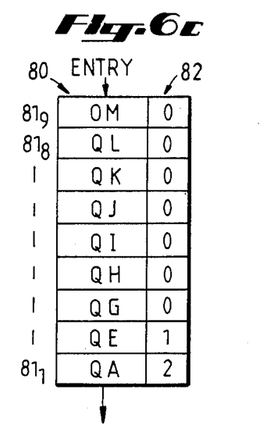

In FIGS. 6a, 6b and 6c has been represented schematically a buffer memory 80 comprising nine multibit memory positions, for example of 12 bits each, these positions being marked by the numbers $81_9$ to $81_1$ from top to bottom in the figure.

Next to these memory positins is also shown a register 82 with nine positions $83_9$ to $83_1$ so that to each position 81 of the buffer memory 80 there corresponds a position 83 of the register 82.

The buffer memory 80 is a first-in first-out (FIFO) type memory in which the values $Q_A$ to $Q_I$ are introduced from the memory position $81_9$ (input position) and shifted successively toward the output position $81_1$ as new measurement values are entered. The initial filling of the buffer memory 80 (FIG. 6a) corresponds to the successive acquisition of the samples 60A to 60I of FIG. 4 at equal time intervals.

During each elimination of a sample, the interval between the acquisition times of the preceding sample, in the order of entry into the memory, and of the following sample, is a multiple of a power of two of the deviation or elementary acquisition interval. Thus, in the table of FIG. 6b which corresponds to the state of the memory 80 after the elimination of the samples 60B and 60D, the deviation between the samples 60A and 60C, on the one hand, and 60C and 60E on the other is equal to twice the elementary deviation. The obseration of FIG. 6c shows that, after elimination of the samples 60B, 60C, 60D and 60F, the deviation between the samples 60A and 60E, which is the first encountered when going through the series of samples in their order of acquistion, is equal to four times the basic interval, or $2^2$. The deviation between the two following samples 60E and 60G is equal to twice the basic interval, or $2^1$. The deviation between all the pairs of the following consecutive samples is equal to one, or $2^0$ times the basic interval.

In FIGS. 6a to 6c has been noted, opposite each value $Q_A$ to $Q_M$ of the samples in correspondence 60A to 60M entered in the memory 80, the value of the multiplier defining the interval between this sample and the sample which follows it in the order of acquisition. This value is defined by the corresponding exponent of the power of two and is stored in the respective memory position 83 of the register 82.

In practice, the deviation associated with each sample of the buffer memory is entered in binary value in the corresponding box of the register 82. Thus, just three bits are sufficient in each of the positions $83_1$ to $83_9$ of the register 82 to characterize the interval associated with each sample in the buffer memory over a range which can be as high as 128 ($2^7$) times the basic acquistion interval.

After each acquisition of a new value Q by the buffer memory, it is scanned from the oldest samples acquired up to the most recent to look for couples of successive samples separated by equal intervals, i.e. represented by equal associated indices in the register 82. Each time a couple of equal intervals is detected, it is verified whether the acceptance conditions of the hinge sample of these two intervals, described previously and illustrated by means of bars 64 to 70, is verified. In the affirmative, this hinge value is conserved, the sample in position $81_1$ is removed from the memory to be recorded in the nonvolatile memory and all the samples in the buffer memory are advanced by one step so as to allow the entry of a new sample in the position $81_9$.

On the other hand, if the acceptance condition shown schematically by means of the bars 64 to 70 is not satisfied, the intermediate or hinge sample is eliminated, the deviation index associated with the sample which precedes it immediately is incremented by 1, and all the samples which follow it are shifted in the buffer memory 80 so as to free the location $81_9$ for the entry of a new sample. If this elimination process is repeated a sufficiently large number of times before the sample $Q_E$ in position $81_1$ has been removed from the memory 80, it is understood that a condition will be reached in the register 82 in which the positions $83_9$ to $83_1$ are entered respectively by the indices 0, 1, 2, 3, 4, 5, 6 and 7. In this situation, the scanning does not show any equally spaced couple of samples and, to allow the entry of a new acquired sample, the sample $Q_4$ and its deviation index 7 are transferred to the nonvolatile memory. Thus, with a buffer memory comprising n+1 memory positions, the maximum deviation between two samples recorded consecutively in the nonvolatile memory is equal to $2^{n-1}$ times the basic acquistion interval.

Figure 7:
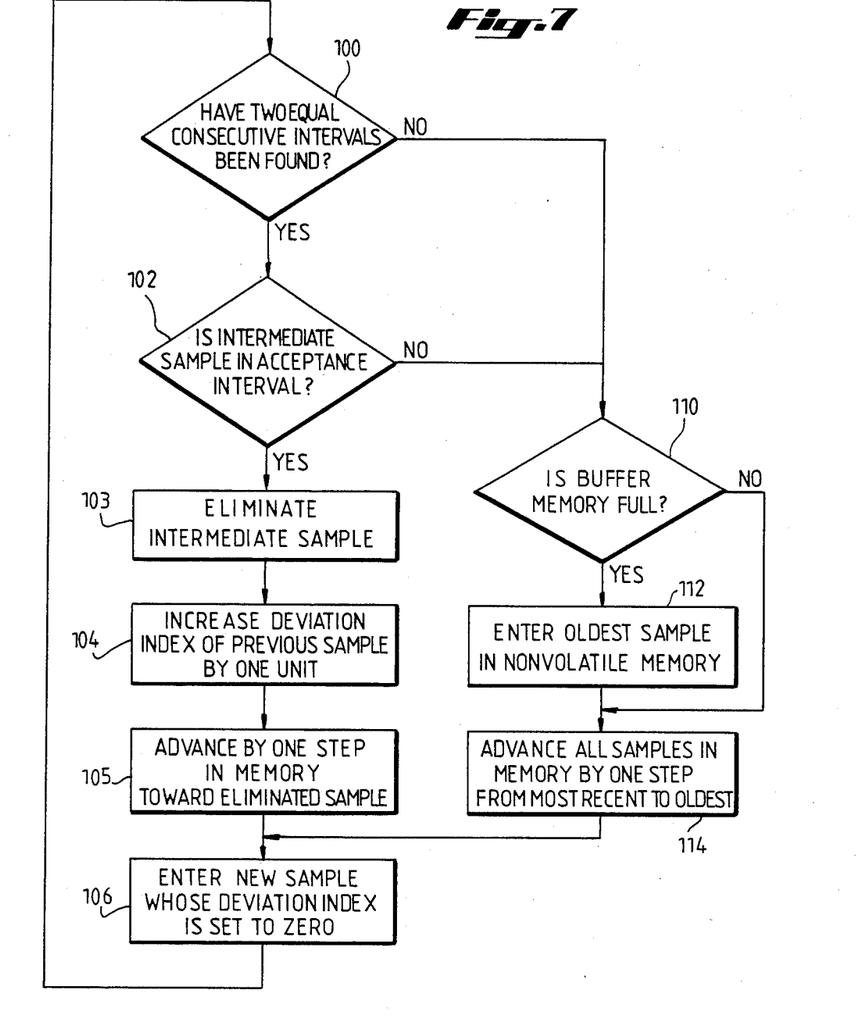
FIG. 7 is a schematic flowchart of the operation of an apparatus according to the invention for the reduction of the number of measurement samples recorded.

The process for reducing the data entered in the nonvolatile memory by selective elimination can be summarized by referring to the flowchart of FIG. 7. The contents of the buffer memory 80 are scanned in order from the oldest sample stored toward the most recent. One then determines (block 100) the first couple of equal consecutive intervals between a first, a second and a third sample.

Figure 4:
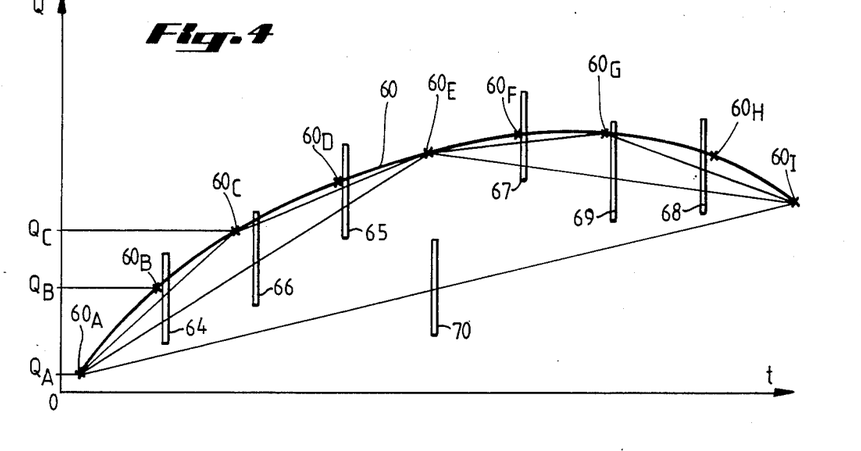
FIG. 4 illustrates the explanations relative to the selection process for the measurement samples acquired in such a sonde for their recording.

If such a couple of intervals is found, it is determined whether the second sample, or intermediate sample, is within the acceptance interval as represented by the rules 64 to 70 of FIG. 4 (block 102). If it is within this interval, it is eliminated from the buffer memory (block 103) and the deviation index of the first sample is increased by one unit (block 104). Then, all the samples entered after the eliminated sample are advanced by one step in the buffer memory in the direction of the memory position vacated by the eliminated sample (block 105). The buffer memory is positioned to wait for a new sample which will be entered by setting its deviation index to zero (block 106) and we then come back to block 100 for another scanning of the buffer memory.

If the intermediate sample is not within the acceptance interval or if the scanning does not make it possible to find two equal consecutive intervals, the buffer memory is checked to see whether it is full (block 110). If it is not, all the samples in the memory are advanced by one step in the direction from the most recent to the oldest (block 114). In practice, this operation is carried out by advancing by one step toward the output of the memory the sample acquired first and then advancing into the position thus freed the preceding sample, and so on moving up toward the most recently entered sample. After this operation, we return to block 106.

If, after a negative response to the test of one of the blocks 100 or 102, it is observed that the memory is full (block 110, output YES), the oldest sample is taken out of the memory (block 112) and is entered in the nonvolatile memory before shifting by one step all the samples remaining in the memory (block 114).

Thus, whenever a new measurement is acquired, the input position of the buffer memory is freed to allow its entry. This is accomplished, after the initial filling of the buffer memory up to its maximum capacity, either by eliminating a sample already in memory or by removing the oldest sample entered in this memory to enter it in the nonvolatile memory.

Figure 8:
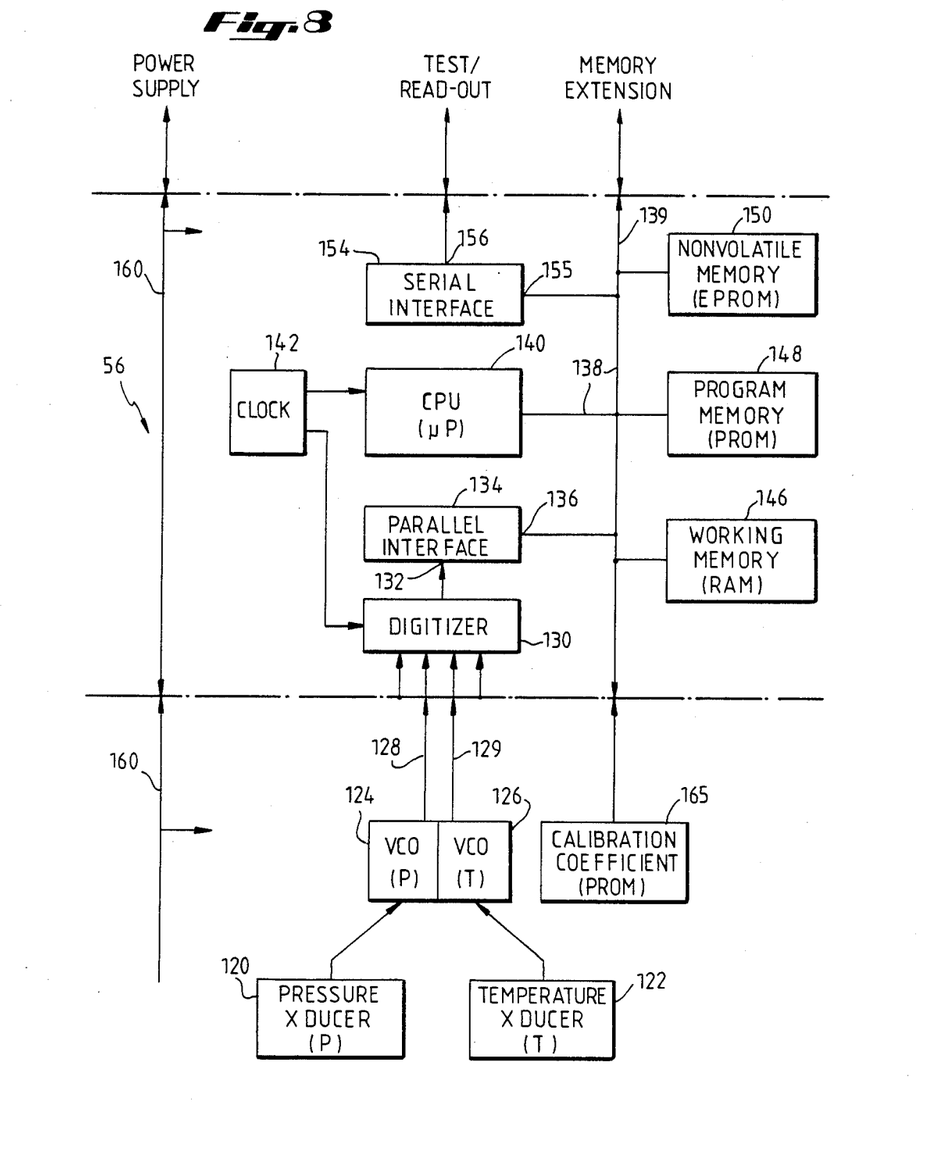
FIG. 8 is a block diagram of the make-up of the internal circuits of a sonde implementing the principles of the invention.

In FIG. 8 has been represented the general organization of the circuits of the tool in the form of a block diagram. The pressure transducer 120 and the temperature transducer 122 are connected respectively to two frequency controlled oscillators (VCO) 124 and 126 which furnish on their respective outputs 128 and 129 frequency signals which are applied, in the acquisition and recording cartridge 56, to a digitizer 130. This digitizer carries out, after shaping and multiplication, a count of the oscillations present on the outputs 128 and 129 during respective predetermined periods of time. Frequency multiplication makes it possible to increase the resolution of the measurement. For example, for measurements performed every second, the pressure oscillations are counted for a period of about 60/64 second, their frequency after multiplication being capable of ranging between 140 kHz and 1 MHz. Temperature oscillations are counted during the period of 4/64 second remaining for a frequency varying between 200 kHz and 700 kHz. The output bits of the digitizer 130 are applied to the input ports 132 of a parallel interface 134 whose output 136 is connected to a bus 138 providing the interconnection of the different elements of a microprocessor comprising a central processing unit 140, for example a circuit 6100 marketed by INTERSIL, operating under the control of a clock 142. The bus 138 is also connected to a working read-write memory (RAM) 146, to a programmable read-only memory (PROM) 148 containing the microprogram determining the different operating phases of the tool, and to an erasable nonvolatile data memory 140, 150 for example a circuit EPROM 2732 marketed by INTEL. This data memory comprises, in the example described, 16 kilo octets (kbytes). It is intended for the recording of the pressure and temperature data selected after a data reduction process in conformity with the flowchart of FIG. 7. The data memory capacity can be increased by connecting an extension 139 from the bus 138 to one or more additional memory units.

The data recorded in the memory 150 can be read once the tool has been brought back up to the surface by means of a read module connected to the serial interface 154 whose input 155 is connected to the bus 138 and whose output ports 156 can be connected, in addition to the read unit just mentioned, to a box for testing the operation of the circuits used before lowering the sonde into the well in order to program the sondes in a given configuration and to check their operation.

At 160 has been shown schematically a power supply line for all the processing and measurement circuits (transducers) from battery modules 58. This line supplies in particular, through suitable conventional electronic power supply circuits, the clock 142 and the circuits of the microprocessor.

A calibration coefficient memory is provided in the form of a programmable read-only memory (PROM) 165 in which are permanently recorded the calibration coefficients allowing the conversion between the gross values measured (directly proportional to the output frequencies of the VCOs) and recorded, and the pressure and temperature values expressed in physical units which are calculated on the read module of the surface. The memory 165 is connected to the bus 138 and the programming unit 148 is programmed to transfer the contents from 165 to 150 at the beginning of each test. The raw data before compression appear on the output 136 of the parallel interface.

The bus, instead of having separate connections for the data and addressing, can be a data-address multiplex bus completed by control lines defining the signal transmission windows on the bus, buffer registers (latches) being provided at the input of each module connected to the bus for the temporary recording of the address.

Figure 5:
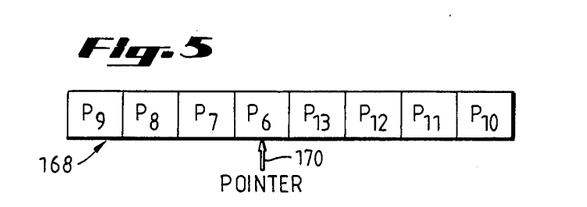
FIG. 5 illustrates the composition of a device for smoothing the measurement data processed as they are acquired.

As concerns the acquisition and the storage of the data proper, the principle is the following:

As they appear, the digital data for pressure and temperature are handled by the microprocessor, these data being acquired in pressure-temperature couples. If desired by the operator, the acquired measurement data can be smoothened by calculating the average of each new data item and of the seven or fifteen data (depending on the choice made by programming on the surface) previously acquired by means of a circulating memory as shown schematically in FIG. 5. This memory is in fact made up of a group of eight or sixteen memory positions within the working read-write memory 146 associated with a pointer represented by the arrow 170. During each new acquisition of a pressure value such as $P_{13}$ after the values $P_6$ to $P_{12}$, the microprocessor determines the average P'q of these eight values stored temporarily in memory. It is this value P'q which is subsequently processed in order to determine its possible recording in the permanent data memory 150. Thus, this processing takes place on values previously smoothened by this average calculation. After each acquisition of a new value such as $P_{13}$, the pointer 170 is shifted by one step always in the same direction toward the position of the oldest value acquired, so that at all times the eight- or sixteen-position circulating memory 168 contains the eight or sixteen last digitized pressure values acquired.

The smoothened values of the successive pressure measurements acquired with each second or at another frequency selected at the beginning of the test are stored in a buffer memory such as 80 of FIGS. 6a to 6c made up of a group of multibit memory positions within the working read-write memory 146, the corresponding temperature values being recorded in parallel in a group of specific memory locations. The recording program is conducted so that each time a digital pressure value is eliminated from the buffer memory, the corresponding temperature value is also eliminated and each time a pressure value is recorded at the output of the buffer memory, the corresponding temperature value is recorded in a parallel position of the nonvolatile data memory 150.

Figure 9:
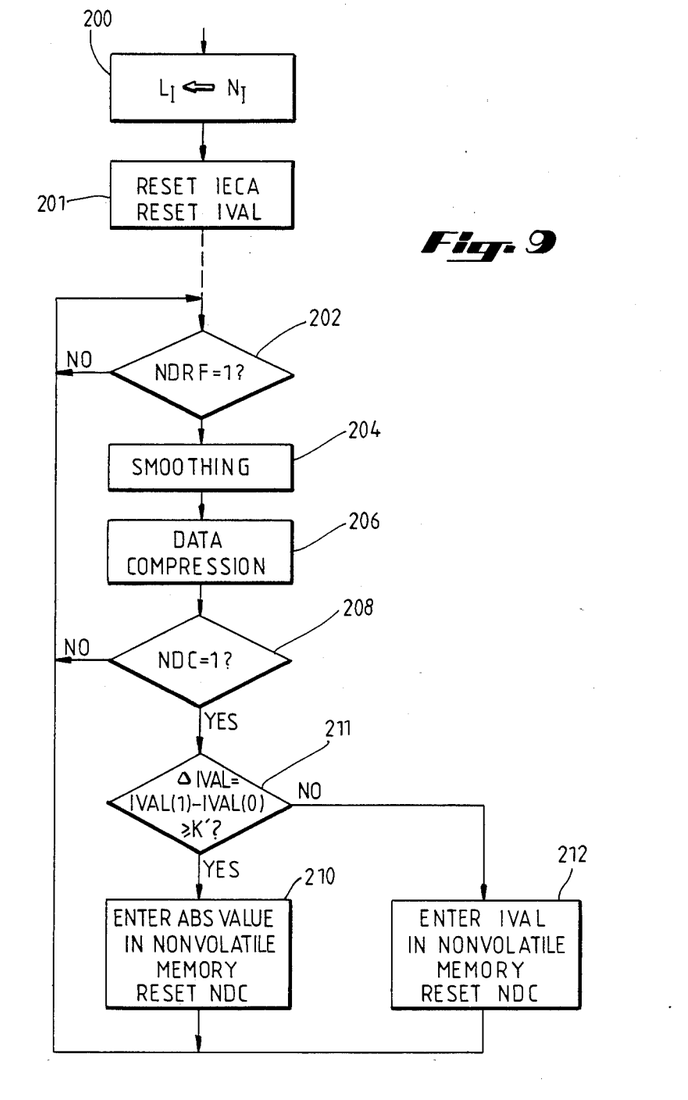
FIG. 9 is a general flowchart of the operation of the circuit of FIG. 8 for the analysis of the data successively acquired.
Figure 10:
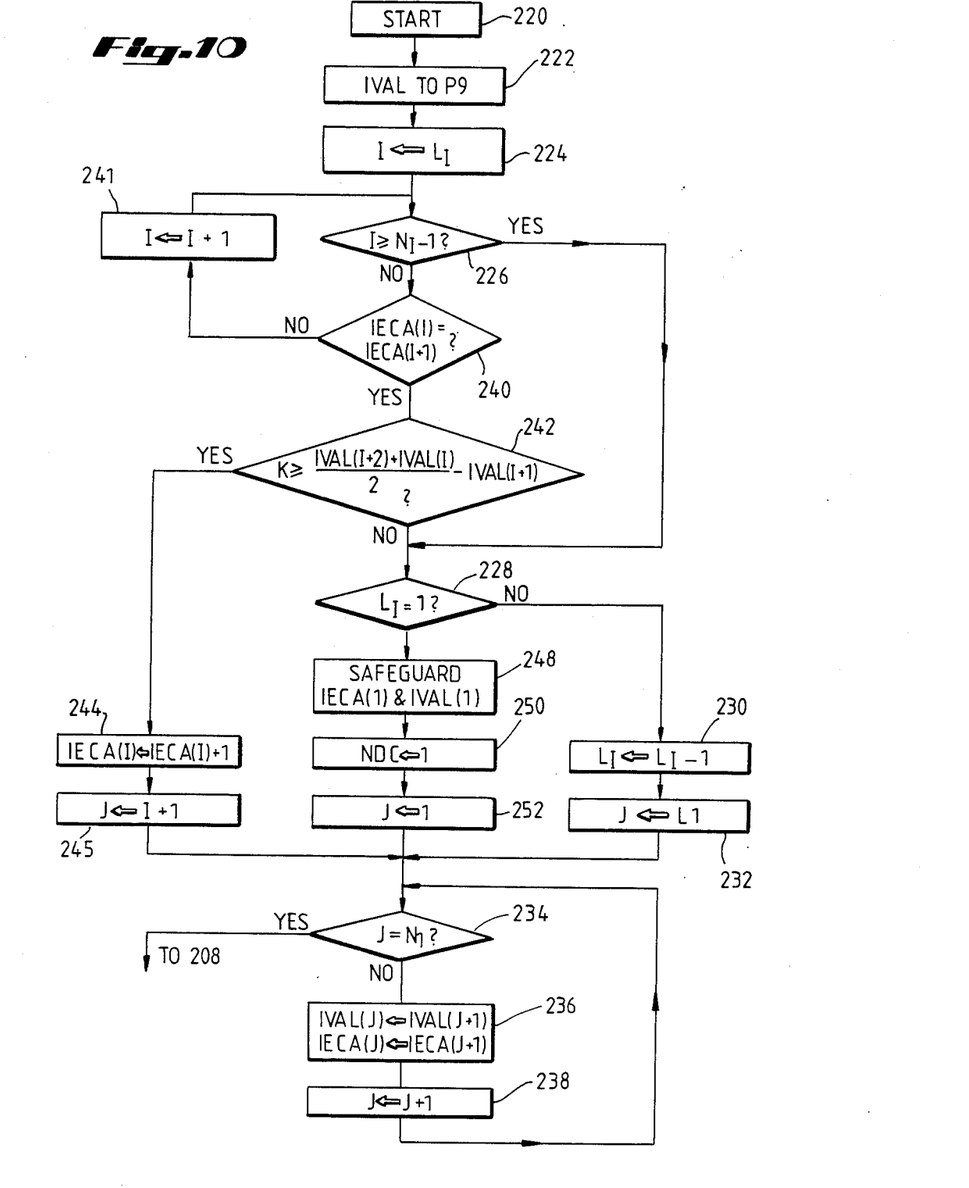
FIG. 10 is a detailed flowchart of the operation of the device of FIG. 8 for part of the operations illustrated in FIG. 9.

A more detailed description now follows with reference to FIGS. 9 and 10 of the implementation of the process for the selection of digital pressure data as they are acquired for recording in the nonvolatile memory 150.

FIG. 9 illustrates a general flowchart in which, in an initialization phase (block 200), an index $L_1$ is set to the value $N_1$ in which $N_1$ represents the number of positions of the buffer memory in the read-write memory 146. In the described example, this buffer memory includes nine positions of 48 bits each, 19 bits for pressure, 13 bits for temperature, 3 bits for the deviation and 13 bits not used. The index $L_1$ is thus initially set at the value 9. The purpose of the index $L_1$ is to keep a trace of the degree of filling of the buffer memory, its value varying from the value $L_1=9$ when the memory is empty to the value $L_1=1$ when the memory is full. The buffer memory positions intended to receive the pressure values (IVAL), the temperature values and the deviation values (IECA) are set to zero (block 201).

With each appearance of a couple of digitized pressure and temperature values, an interrupt signal appears at the interface 136 which sets an index NRDF to the value 1. The microprocessor consequently scans the interface 134 for the appearance of a signal NDRF=1 (decision block 202) and, in its absence, comes back to its starting point. When a pressure (and temperature) word is detected (output YES), a smoothened value of this data is determined as explained above (block 204) and the data compression routine is implemented (block 206) in a manner which will be explained later in greater detail.

If, following a data compression routine, a pair of pressure and temperature words is put out from the buffer memory, an index NDC is set to 1. The program thus verifies (block 208) whether, after the routine 206, the index NDC is equal to 1 and, if not, comes back to the input of the block 202 to await the acquisition of another data item. If yes, the procedure for recording in the nonvolatile data memory 150 the pair of digitized pressure and temperature data coming from the buffer memory is undertaken (blocks 210 and 212) and the NDC index counter is then set to zero. In order to further compress the pressure data, provision is made for recording in the nonvolatile memory only the pressure deviation between each sample recorded and its predecessor in the nonvolatile memory when the length of the word corresponding to this deviation is less than 12 bits, as explained below with reference to block 211.

The program then goes back to the input of block 202 awaiting another data acquisition.

FIG. 10 represents in detail the stages of the data reduction routine 206. It is triggered by the starting block 220 and uses in the read-write memory 146, in addition to the index $L_1$, the following indices:

an index I called the table index used in the search for equal intervals between the data stored in the buffer memory;

an index J used for locating the successive positions of the buffer memory (FIFO) so as to carry out the successive shifting of the values within this memory.

Furthermore, in the data positions of the buffer memory are entered indications IVAL for each digital pressure value.

Thus, adjacent pressure values in the buffer memory can be designated, from top to bottom with reference to FIGS. 6a, 6b, 6c, by IVAL (I+2), IVAL (I+1) and IVAL (I), the indices I, I+1 and I+2 characterizing the fact that these values are entered in consecutive successive positions of the buffer memory at a given moment, even if these values were initially separated by subsequently eliminated intermediate values.

Finally, the buffer memory positions play the role of the positions $83_9$ to $83_1$ of FIGS. 6a to 6c and record indices IECA in association with each digitized pressure data item in memory. These indices are the previously defined deviation indices. They can vary from 0 to 7 and characterize, for each pressure value, the interval with the value which follows it in the direction of data circulation between the input and output of the buffer memory. As for the values IVAL, the position of the indices IECA can be characterized by means of the index I.

The buffer memory with $N_1=9$ positions is initially empty and, after smoothing, we enter the first data item IVAL at the origin of the interrupt signal NDRF=1 (block 202, FIG. 9) in the ninth position of the buffer memory (block 222). The index I is set at the value $L_1$ (block 224, FIG. 10). It will be recalled that $L_1$ has been positioned at the value 9 in the initialization block 200.

It is verified that I is greater than or equal to $N_1-1$ (block 226), which is the case here since $I=N_1=9$, and we go on to block 228 to check whether $L_1$ is equal to 1 (buffer memory full). If not, the index $L_1$ is decremented by one unit (block 230) and the index J is set at the new value of $L_1$ (block 232), or J=8 in this situation. It is verified (block 234) whether $J=N_1$, which is not the case here, and we then go on to a shifting stage (block 236) in which the pressure data values IVAL (J+1) and deviation values IECA (J+1) are made to go from position 9 to position 8 of the buffer memory. It will be recalled that these positions were initially empty. The index J is incremented by the value of one unit (block 238) and we come back to the input of the decision block 234 to check whether J is equal to 9. The verification 234 turns out to be positive (J=9) and the routine comes out on the stage 208 of the general program (FIG. 9) and returns to a waiting position for a new data item toward the block 202.

The new data item is entered in the buffer memory position 9 (block 222) and the index I is set to 8 (last value of $L_1$, block 224). The test 226 being positive, we go on to the test 228 after which the value of $L_1$ is decremented to 7 and J set at this value (blocks 230 and 232). The data in the memory position 8 are shifted to position 7 by the routine 234, 236 and 238. Similarly, the values in position 9 are transferred to position 8.

When a third data item appears at the input of the microprocessor, the index I is then equal to 7 and the test of the block 226 is then negative. It is checked whether the deviations associated with the positions 7 and 8 are equal (block 240). This test is positive because the three values in the respective positions 7, 8 and 9 are also spaced two by two. We then determine whether the half-sum of the values in the positions 9 and 7 are within an acceptability interval in relation to the value IVAL (I+1) in position 8 by determining whether the inequality:

$$K \geq \frac{IVAL\ (I+2) + IVAL\ (I)}{2} - IVAL\ (I+1)$$

is confirmed. If this inequality is not confirmed (block 242), the program then goes to the test of block 228 to again carry out a shifting of the values in the buffer memory in the direction of its output, the positions 8, 7 and 6 then being filled at the end of this operation before the return to waiting by 208 toward 202, through the shifting subroutine 234, 236, 238.

If, on the contrary, the test of the block 242 is positive, this means that the intermediate value IVAL (I+1), in this case the value stored in position 8, can be eliminated. Consequently, the deviation index assigned to position 7 is incremented by one unit (block 244) and, in this example, brought to the value 1 (two basic time intervals).

The index J is set to the value I+1 (block 245) and the program returns to the test 234 for the shifting of data through the buffer memory. The practical effect is that, through the block 236, the value which was located in position 7 will not change whereas the value which was located in position 9 is transferred to position 8, the value initially in this latter position then being eliminated.

The filling of the buffer memory continues in accordance with the different stages and iteration loops just described, i.e. with, for each new data acquisition, the elimination of a data item entered or the advance of the oldest data acquired by one step toward the exit of this memory. When the oldest data has advanced to position 1 of the buffer memory ($L_1$=1), the test of block 228 becomes positive and the values IECA and IVAL of this position are entered in a safeguard position in the read-write memory (block 248) and then the index NDC is set to 1 (block 250) and the index J is set to the value 1 (252).

This latter value of the index J is tested in block 234 to cause the shifting by the subroutine 236, 238 of all the values in the memory or buffer memory by one step, the data in position 2 now being entered in particular in position 1 in place of the safeguarded data.

The data compression subroutine terminates at the exit of block 234 and, after the verification of the index NDC (block 208, FIG. 9), it is verified whether the pressure variation $\Delta IVAL = IVAL\ (1) - IVAL\ (0)$ is greater than or equal to a given value k' (block 211).

By IVAL (1) has been designated the safeguarded pressure value for recording in stage 248 (FIG. 10) and by IVAL (0) the previously safeguarded pressure value at the output of 248 stored in a special memory position at the same time as the corresponding information is recorded in the nonvolatile memory. If the test 211 is positive, the absolute pressure value IVAL (0) is entered in the nonvolatile memory. (block 210). Otherwise, $\Delta IVAL$ is entered in this memory on 12 bits (block 212). The microprogram thus described is incorporated in the program memory 148. It is noted, as concerns test 240, that the value of I being initially set on that of $L_1$, the buffer memory is scanned in search of equal deviation indices by going from its output toward its input. When the test 240 is negative, the Index I is incremented by one unit (block 241) so as to search for any equal deviation couples progressing toward the input of this register.

In association with the indications IVAL and IECA is also stored in each buffer memory position the corresponding digital temperature indication. Thus, the shifting of these temperature data takes place at the same time as that of the corresponding pressure values, as do their elimination and their recording.

Thanks to the use of the microprocessor and to the low consumption of the electronic circuits presently available, it is possible to keep the measuring apparatus in a standby condition as of its lowering into the well, condition in which the system simply maintains a trace of the time elasping. It is programmed so as to connect all the processing and measuring circuits to the batteries only at a given moment predetermined in advance according to the time at which the measurement is planned, for example, the measurement of pressure build-up in the well by closing the wellhead.

It is thus possible to provide largely for the time necessary for manipulating the tool on the surface and for lowering it to the desired position without consuming a large amount of energy stored in the batteries. Knowing that the batteries used for this type of application are high-cost lithium cells capable of operating at high temperature, a substantial economy is thus achieved on the number of batteries to be provided to carry out a measurement operation in the well.

The operation of the measurement circuit is triggered shortly before the closing of the well, producing the acquisition and recording of the measurements of the pressure $P_0$ prevailing with respect to the formations during a period of time extending up to the time $t_0$ of the well closure (FIG. 2). Data compression is applied as soon as this triggering has taken place.

The apparatus used allows a precise analysis of the pressure build-up curve providing a sampling rate, 1 second here, which is relatively fast in relation to the sampling rate of about 30 seconds used hitherto with prior-art recording apparatus. However, this very substantial increase in the sampling rate is not penalized by the obligation to use considerable memory capacities to cover the sometimes very long measurement period. In fact, the selective recording arrangements for the data acquired at regular intervals makes it possible to accumulate in the memory only the data which are really significant for plotting the curve with the desired accuracy. One thus combines the advantages of a high sampling rate and a relatively economical memory capacity. In addition, the apparatus is amenable to a simple construction since the sampling rate can be maintained at a constant value, even a high value, throughout the operation.

The apparatus just described makes it possible to record several values simultaneously and, in the case where these values are related to each other, to apply to them an identical selection procedure intended to maintain the capacity of the memory at an acceptable level.

The apparatus is applicable in a particularly satisfactory manner to the measurement of values which can undergo very rapid and very slow variations during the same operation, but in a uniformly variable manner, or when in certain partial intervals at least the evolution of the measured value takes place in a uniformly variable manner. In the case of measurements in petroleum wells under production by means of sondes not connected electrically to the surface, it is particularly well suited to the measurement of the evolution of pressure, temperature and flow, notably as a function of time.

Finally, as concerns the actual recording of the data acquired in an isochronous manner, it is noted that the selection procedure is necessarily accompanied by the coding of the position of each measurement with reference to the parameter used, i.e. as a function of time in the case of a pressure build-up curve for example. This coding allows an economic design since a few bits are sufficient for defining the deviations between the samples entered successively in the nonvolatile memory within an extremely wide range, each of these deviations being a multiple of a power of two of a basic or elementary deviation corresponding to the acquisition interval.

It is also noted that the selection described takes place by means of a relatively limited number of memory positions to constitute a suitable buffer memory or register. It was seen for example that with nine successive memory positions it was possible to eliminate, when the slope of the measured value varies little, a number of successively acquired samples which can reach $2^7 = 128$ between two stored samples. The corresponding intervals are coded by means of three bits permitting the binary notation of the indices from 0 to 7 for each memory position.

In general, if the size of the buffer register is n positions, the maximum data reduction rate is $2^{n-2}$. It is then advantageous, to obtain maximum efficiency in the coding of the deviations, for the value $n-2$ to be equal to a power of two minus one.

Finally, the data reduction method chosen for the recording of the measured values makes it possible to limit the uncertainty on the nonrecorded measurements (i.e. the difference between the estimated value of a sample and its real value). The maximum uncertainty is related to the number of consecutive samples eliminated. If K is the value of the acceptance interval, it is noted that when the number of digital samples eliminated increases between two recorded samples, the maximum uncertainty which affects a point of the curve connecting these two samples tends toward a maximum value of K. The method thus described moreover has the advantage of being highly predictive, i.e. it lends itself to the determination of the samples to come from the samples recorded with a good probability.

The method can also be applied to the compression of other data measured in wells, for example displacement measurements coming from a caliper logging tool.

It goes without saying that the deviation indices used can be attached to the following sample and not to the preceding sample in the buffer memory.

We claim:

1. Apparatus for carrying out measurements of the variations of a value in a well as a function of a parameter, by means of a sonde lowered into this well and equipped with at least one transducer sensitive to said value, comprising:

means for acquiring successive samples representative of said value at equal predetermined intervals as a function of the evolution of said parameter;

means capable of selecting, from among the consecutive samples at the output of said acquisition means, samples between which the rate of change of said value has undergone a variation greater than a given threshold;

means for determining a variation interval denoting the time separation of said selected successive samples; and means for recording data corresponding to said selected samples and respective deviation indices derived from said variation intervals in order to compress the recorded data, wherein each of said variation intervals is expressed as a power of two times an elementary interval, where n is the deviation index.

2. Apparatus as defined in claim 1, wherein said recording means are moreover capable of recording any sample newly acquired separated from the last recorded sample by a variation interval of said parameter greater than a predetermined limit.

3. A method for recording measurements of a physical value characteristic of the condition of an underground reservoir, obtained by means of a sonde lowered into a well, the sonde containing at least one transducer sensitive to this value, a computer device including a buffer memory of the first-in first-out type and a nonvolatile memory unit, and a timing device operated in accordance with the evolution of a parameter in relation to which it is sought to record the variation in said value, to produce interval signals at constant elementary intervals of this parameter; comprising the steps of:

producing signals indicative of said value by means of said transducer;

forming digital samples of said value from said signals of the transducer in correspondence with each of said interval signals;

entering each of said digital samples in the buffer memory in its order of acquisition;

entering into the buffer memory, in correspondence with each sample entered, a deviation index which is an integer n initially set to zero for a newly entered sample, said index being characteristic of the variation interval of the parameter separating a sample entered in the buffer memory from the following sample in the order of entry into this buffer memory;

and after each entry of a sample:

(a) scanning the buffer memory in search of two equal consecutive deviation indices, these two indices corresponding to a first, a second and a third adjacent sample in the order of their entry into said buffer memory;

(b) if the search of step a) is unsuccessful, and if the memory is full, making a recording in said nonvolatile memory of a digital information item corresponding to the oldest sample acquired in the buffer memory, after which a new sample can be entered in said buffer memory;

(c) if the search of step a) shows such a set of a first, a second and a third sample, making a check, by means of the computer, to determine whether these samples satisfy a predetermined relation denoting that the rate of change of said value between the first and the third sample has undergone a variation smaller than a predetermined threshold;

(d) if the relation of step (c) is satisfied, eliminating the second sample from said buffer memory and incrementing the deviation index n of the first sample by one unit, such incrementation reflecting the increase by a factor 2 of the interval between said first sample and the following sample, after which a new sample can be entered in the buffer memory;

(e) if this relation of step (c) is not satisfied and if the buffer memory is full, entering information corresponding to the oldest sample in the buffer memory into the nonvolatile memory, after which a new sample can be entered in the buffer memory.

4. A method as defined by claim 3, wherein after each entry of information into the nonvolatile memory, each of the samples in the buffer memory is shifted from one position to the next in the direction of the buffer memory position of the sample corresponding to the entered information; and after each elimination of a sample, each of said samples acquired after said eliminated sample is shifted from one position to the next in the direction of the buffer memory position of said eliminated sample.

5. A method as defined in claim 4, wherein the scanning operation is carried out beginning with the oldest sample entered in the buffer memory and progressing toward the most recently entered sample.

6. A method as defined in claim 4, wherein said buffer memory possesses a predetermined number of memory positions between the input position and an output position.

7. A method as defined in claim 3, wherein the information which is entered after the steps (b) and (e) is the digital sample itself when the variation of the value between this sample and the information previously entered in the nonvolatile memory exceeds a predetermined threshold, and an indication of this variation when it is not.

8. A method as defined in claim 3, wherein said predetermined relation in step (c) denoting rate of change is determined between the first, second and third sample, in accordance with whether the difference between the half-sum of the first and third samples on the one hand, and the second sample, on the other, is less than a predetermined threshold.

9. A method as defined in claim 3, wherein each of said samples is obtained by a smoothing operation carried out on the measurements at the output of said transducer.

10. A method as defined in claim 3, wherein said measured value is at least one of the following: a pressure, a temperature, a flow, and a displacement.

11. Apparatus for recording measurements in a well comprising a sonde capable of being lowered into the well and including in the sonde:

at least one device for measuring the variation of a physical characteristic in the well as a function of a parameter;

means for acquiring samples of said measurements at equal successive intervals of said parameter;

a buffer memory of the first-in first-out type comprising a predetermined number of memory positions in order to enter successively the samples appearing at the input of this memory coming from said acquisition means in accordance with the variation of said parameter with, for each sample, a deviation index characteristic of the interval of said parameter which separates it in time from an adjacent sample in the order of the entry of samples in the memory; with each variation interval being expressed as a power (n) of two times an elementary interval, where n is the deviation index;

a memory of nonvolatile type capable of recording information corresponding to the samples appearing at the output of said buffer memory; and a management unit capable of scanning the contents of the positions of said buffer memory between the output of this memory and its input to determine whether there exists, in positions of this memory containing adjacent samples in their order of entry, a first, a second and a third sample such that the interval of the parameter separating the first and second sample is equal to the interval of the parameter separating the second and the third sample; said management unit comprising means capable, in the absence of such samples, of producing the entry into the nonvolatile memory of information corresponding to the oldest sample entered and, in the presence of such first, second and third samples, of checking whether these samples satisfy a predetermined relation denoting that the rate of change of the value between the first and the third sample has undergone a variation smaller than a predetermined limit so as to eliminate, if this relation is verified, said second sample from the buffer memory, increment in the buffer memory the deviation index between the first and the second sample, and allow the entry of the next sample; and, if this relation is not satisfied, so as to enter in said nonvolatile memory information corresponding to the oldest sample entered in the buffer memory, and enter the next sample in this buffer memory.

12. Apparatus as defined in claim 11, wherein the management unit comprises means capable of producing the shifting of the samples entered with their respective deviation index, from the input of the buffer memory to the position of the second sample in the case where the second sample is eliminated, and between the input and the position of the oldest sample entered in the opposite case where information is entered in the nonvolatile memory.

13. Apparatus as defined in claim 12, wherein each position of the buffer memory comprises a location for the entry of a sample of said value and at least one location for the entry of an associated sample representative of a second value acquired jointly, said management means being capable of eliminating and shifting from one memory position to the next said samples of the second value with the samples with which they are associated.

14. Apparatus as defined in claim 11, wherein each position of the buffer memory comprises a location for storing a sample and a location for storing a deviation index characteristic of the interval which separates this sample from the next sample in the order of entry of said samples.

15. Apparatus as defined in claim 11, wherein said management unit comprises means for producing, when the buffer memory is full, depending on whether or not the variation of said value between the sample previously entered in the nonvolatile memory and the oldest sample entered in the buffer memory exceeds a predetermined threshold, the entry of the value of this latter sample or of an indication of this variation.

* * * * *